(12) United States Patent
Kitagawa et al.

(10) Patent No.: US 7,893,667 B2
(45) Date of Patent: Feb. 22, 2011

(54) PWM POWER SUPPLY APPARATUS HAVING A CONTROLLED DUTY RATIO WITHOUT CAUSING OVERALL SYSTEM OSCILLATION

(75) Inventors: Atsushi Kitagawa, Kyoto (JP); Hiroaki Asazu, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 510 days.

(21) Appl. No.: 11/996,228

(22) PCT Filed: Aug. 2, 2006

(86) PCT No.: PCT/JP2006/315300

§ 371 (c)(1),
(2), (4) Date: Jan. 18, 2008

(87) PCT Pub. No.: WO2007/018089

PCT Pub. Date: Feb. 15, 2007

(65) Prior Publication Data

US 2009/0284237 A1    Nov. 19, 2009

(30) Foreign Application Priority Data

Aug. 5, 2005    (JP) .............................. 2005-227480

(51) Int. Cl.
*G05F 1/46* (2006.01)
(52) U.S. Cl. ........................ 323/222; 323/283; 323/284
(58) Field of Classification Search ................. 323/222, 323/282, 283, 284
See application file for complete search history.

(56) References Cited

U.S. PATENT DOCUMENTS

| | | | |
|---|---|---|---|
| 4,644,196 A | 2/1987 | Flannagan | |
| 4,724,337 A | 2/1988 | Maeda et al. | |
| 4,789,799 A | 12/1988 | Taylor et al. | |
| 4,881,041 A | 11/1989 | Kawanabe et al. | |
| 4,992,757 A | 2/1991 | Shin'e | |
| 5,179,731 A | 1/1993 | Tränkle et al. | |
| 5,182,476 A | 1/1993 | Hanna et al. | |
| 5,572,158 A | 11/1996 | Lee et al. | |

(Continued)

FOREIGN PATENT DOCUMENTS

CN    1954480 A    4/2007

(Continued)

OTHER PUBLICATIONS

Joonsuk Lee et al., "A Low-Noise Fast-Lock Phase-Locked Loop with Adaptive Bandwidth Control," IEEE J. of Solid-State Circuits, vol. 35, No. 8, pp. 1137-1145 (Aug. 2000).

(Continued)

*Primary Examiner*—Jeffrey L Sterrett
(74) *Attorney, Agent, or Firm*—Fish & Richardson P.C.

(57) ABSTRACT

A direct-current stabilized power supply apparatus according to the present invention includes offsetting means that keeps a slope voltage (Vslp) shifted from the ground potential to a higher potential by a predetermined offset voltage ΔV so that the lower limit level of the slope voltage (Vslp) is higher than that of an error voltage (Verr). With this configuration, it is possible to provide a direct-current stabilized power supply apparatus that can appropriately control a duty ratio without causing oscillation or the like in the overall system, and also to provide an electrical device incorporating such a power supply apparatus.

11 Claims, 7 Drawing Sheets

U.S. PATENT DOCUMENTS

| | | | |
|---|---|---|---|
| 6,366,070 B1 * | 4/2002 | Cooke et al. | 323/284 |
| 6,384,652 B1 | 5/2002 | Shu | |
| 6,411,145 B1 | 6/2002 | Kueng et al. | |
| 6,426,660 B1 | 7/2002 | Ho et al. | |
| 6,498,466 B1 * | 12/2002 | Edwards | 323/282 |
| 6,680,604 B2 * | 1/2004 | Muratov et al. | 323/285 |
| 6,833,743 B2 | 12/2004 | Gu et al. | |
| 7,148,667 B2 | 12/2006 | Umemoto et al. | |
| 7,714,547 B2 * | 5/2010 | Fogg et al. | 323/224 |
| 2004/0095105 A1 | 5/2004 | Nakata | |
| 2004/0119452 A1 * | 6/2004 | Florence et al. | 323/282 |
| 2005/0077882 A1 | 4/2005 | Nishino | |
| 2007/0108947 A1 * | 5/2007 | Liao | 323/222 |
| 2007/0247131 A1 * | 10/2007 | Sohma | 323/284 |
| 2007/0252567 A1 * | 11/2007 | Dearn et al. | 323/282 |
| 2007/0285073 A1 | 12/2007 | Nishida | |
| 2009/0268492 A1 * | 10/2009 | Omi | 363/84 |
| 2009/0284237 A1 * | 11/2009 | Kitagawa et al. | 323/282 |
| 2010/0045254 A1 * | 2/2010 | Grant | 323/283 |
| 2010/0066333 A1 * | 3/2010 | Noda | 323/282 |

FOREIGN PATENT DOCUMENTS

| | | |
|---|---|---|
| DE | 3816973 A1 | 11/1989 |
| DE | 40 18 615 A1 | 12/1990 |
| EP | 0 343 899 A2 | 11/1989 |
| JP | 61-228720 | 10/1986 |
| JP | 01-315258 | 12/1989 |
| JP | 4-10810 | 1/1992 |
| JP | 05-076169 | 3/1993 |
| JP | 07-336999 | 12/1995 |
| JP | 2004-140913 | 5/2004 |
| JP | 2004-173353 | 6/2004 |
| JP | 2004-320892 | 11/2004 |
| JP | 2005-117784 | 4/2005 |

OTHER PUBLICATIONS

W. Dally et al., *Digital Systems Engineering*, Cambridge University, pp. 606-607 (1998).

K. Nakamura et al., "A CMOS 50% Duty Cycle Repeater Using Complementary Phase Bending," 2000 Symposium on VLSI Circuits Digest of technical papers, pp. 48-49 (2000).

P. Yang et al., "Low-voltage Pulsewidth Control Loops for SOC Applications," IEEE J. of Solid-State Circuits, vol. 37, No. 10, pp. 1348-1351 (Oct. 2002).

* cited by examiner

US 7,893,667 B2

PWM POWER SUPPLY APPARATUS HAVING A CONTROLLED DUTY RATIO WITHOUT CAUSING OVERALL SYSTEM OSCILLATION

TECHNICAL FIELD

The present invention relates to a power supply apparatus for generating a desired output voltage from an input voltage, and to an electrical device incorporating such a power supply apparatus.

BACKGROUND ART

Patent documents 1 and 2 listed below disclose conventional direct-current stabilized power supply apparatuses proposed by the applicant of the present invention.

Specifically, the direct-current stabilized power supply apparatus disclosed in patent document 1 includes an error amplifier amplifying the voltage difference between a feedback voltage varying according to an output voltage and a predetermined reference voltage, and switches an output transistor with the output signal (error voltage) of the error amplifier. More specifically, this direct-current stabilized power supply apparatus generates a PWM (pulse width modulation) signal having a duty ratio corresponding to the comparison result between the error voltage Verr and a predetermined slope voltage Vslp (having a slope waveform or a triangular waveform) so as to turn on and off the output transistor with the PWM signal.

In order to respond to rapid load variations more quickly, the direct-current stabilized power supply apparatus disclosed in patent document 2 controls driving of the output transistor by, while monitoring not only the output voltage but also a switch current flowing through the output transistor and a load current flowing through the load, shifting the slope voltage Vslp appropriately according to the result of the monitoring (so-called current mode control).

Patent document 1: JP-A-H07-336999
Patent document 2: JP-A-2004-173353

DISCLOSURE OF THE INVENTION

Problems to be Solved by the Invention

To be sure, with either of the conventional direct-current stabilized power supply apparatuses described above, it is possible to generate a desired output voltage from an input voltage.

Incidentally, at a light load or at no load, conventional direct-current stabilized power supply apparatuses may go into an excessively stepping-up state.

This inconvenience will now be described more specifically with reference to FIG. 8.

As shown in FIG. 8, in a conventional direct-current stabilized power supply apparatus, the slope voltage Vslp mentioned previously is generated relative to the ground potential irrespective of whether the apparatus operates by typical PWM control or current mode control. On the other hand, due to the circuit configuration of the error amplifier, the lower limit level of the error voltage Verr is usually raised to higher than the ground potential by several to several tens of millivolts. Hence, the conventional direct-current stabilized power supply apparatus described above may go into a state, called an excessively stepping-up state, in which the lower limit level of the error voltage Verr prevents the duty ratio of a PWM signal from being reduced to a desired level.

Even when the error voltage Verr is decreased to its lower limit level, if a direct-current stabilized power supply apparatus operating by current mode control is used as means for supplying power to a load (e.g., an LED (light emitting diode) driver) that consumes a relatively high current, the slope voltage Vslp is shifted from the ground potential to a higher potential according to the load current, with the result that the lower limit level of the error voltage Verr becomes lower than that of the slope voltage Vslp. Consequently, certainly the direct-current stabilized power supply apparatus can be prevented from going into the excessively stepping-up state described previously. However, in a case where the direct-current stabilized power supply apparatus of the same configuration as mentioned above is used as means for supplying power to a load (e.g., a CCD (charge coupled device) camera module) whose load current can be zero (or almost zero), the slope voltage Vslp is not shifted from the ground potential at a light load or at no load. Thus, as described above, the direct-current stabilized power supply apparatus may go into the excessively stepping-up state.

One method to avoid the excessively stepping-up state is to increase the capacity of the error amplifier to reduce the lower limit level. Doing so, however, may cause oscillation or other inconveniences in the entire system, and thus the capacity thereof cannot be increased without due consideration.

An object of the present invention is to provide a power supply apparatus in which a duty ratio can be controlled appropriately without causing oscillation or the like in the overall system, and to provide an electrical device incorporating such a power supply apparatus.

Means for Solving the Problem

To achieve the above object, according to one aspect of the present invention, a power supply apparatus includes: an output transistor generating an output voltage from an input voltage by being turned on and off; an error amplifier amplifying a voltage difference between a feedback voltage commensurate with the output voltage and a predetermined reference voltage to generate an error voltage; a PWM comparator comparing the error voltage with a predetermined slope voltage to generate a PWM signal having a duty ratio corresponding to the result of the comparison; and on/off control means turning on and off the output transistor with the PWM signal. Here, the power supply apparatus further includes offsetting means that keeps the slope voltage shifted from a ground potential to a higher voltage by a predetermined offset voltage so that the lower limit level of the slope voltage is higher than the lower limit level of the error voltage (a first configuration).

According to another aspect of the invention, a power supply apparatus includes: an output transistor generating an output voltage from an input voltage by being turned on and off; an error amplifier amplifying a voltage difference between a feedback voltage commensurate with the output voltage and a predetermined reference voltage to generate an error voltage; a PWM comparator comparing the error voltage with a predetermined slope voltage to generate a PWM signal having a duty ratio corresponding to a result of the comparison; and on/off control means turning on and off the output transistor with the PWM signal. Here, the PWM comparator keeps the slope voltage shifted from a ground potential to a higher voltage by a predetermined offset voltage so that the lower limit level of the slope voltage is higher than the lower limit level of the error voltage (a second configuration).

In the power supply apparatus of the second configuration, the PWM comparator includes, in an input stage thereof: first and second constant current sources, each having one end thereof connected to a power supply line; a first switch element connected between the other end of the first constant current source and a ground line, the first switch element being turned on and off according to the slope voltage; and a second switch element connected between the other end of the second constant current source and the ground line, the second switch element being turned on and off according to the error voltage. Here, the PWM comparator further includes an offset resistor connected between the other end of the first constant current source and one end of the first switch element or between the other end of the first switch element and the ground line, and compares voltages appearing at the other ends of the first and second current sources to generate the PWM signal.

In the power supply apparatus of either of the second and third configurations, the on/off control means includes: an oscillator generating a predetermined clock signal; a reset-dominant SR flip-flop receiving at a set terminal thereof the clock signal and receiving at a rest signal thereof the PWM signal; and a driver circuit turning on and off the output transistor with the output signal of the SR flip-flop. Here, the on/off means further includes a switch circuit controlling whether to input the clock signal to the SR flip-flop according to which of the error voltage and a predetermined threshold voltage is higher (a fourth configuration).

In the power supply apparatus of the fourth configuration, the threshold voltage is set equal to the offset voltage (a fifth configuration).

The power supply apparatus of any one of the first to fifth configurations includes an inductor having one end thereof connected to an input terminal for the input voltage, and having the other end thereof connected to one end of the output transistor; a diode having an anode thereof connected to the one end of the output transistor, and having a cathode thereof connected to an output terminal for the output voltage; and a capacitor having one end thereof connected to the output terminal for the output voltage, and having the other end thereof connected to an input terminal for the reference voltage. Here, the power supply apparatus steps up the input voltage to generate the output voltage (a sixth configuration).

According to yet another aspect of the invention, an electrical device includes a battery serving as a power source of the electrical device and a power supply apparatus serving as means for converting the output of the battery. Here, as said power supply apparatus, the power supply apparatus of any one of the first to sixth configurations is used (a seventh configuration).

ADVANTAGES OF THE INVENTION

With a power supply apparatus according to the invention or an electrical device incorporating such a power supply apparatus, it is possible to appropriately control a duty ratio without causing oscillation or the like in the overall system.

LIST OF REFERENCE SYMBOLS

1 Battery
2 System regulator IC
2P Positive step-up circuit
2M Negative step-up circuit
21 to 2n First to nth regulator circuits
3 CCD camera module
N1 N-channel field effect transistor
Rs Sense resistor
AMP1 Error amplifier
AMP2 Amplifier
E1 Direct-current voltage source
SS Soft-start circuit
OSC Oscillator
ADD Adder
PCMP PWM comparator
FF SR flip-flop (reset-dominant)
DRV Driver circuit
SW Switch circuit
L1 Output inductor
D1 Reverse-current preventing diode (Schottky barrier diode)
C1 Output capacitor
R1 and R2 Resistor
T1 and T2 External terminal
I1 and I2 First and second constant current source
P1 First P-channel field effect transistor (first switch element)
P2 Second P-channel field effect transistor (second switch element)
P3 Third P-channel field effect transistor (third switch element)
Rofs Offset resistor
CMP Comparator
E2 Direct-current voltage source
SLT Selector

BEST MODE FOR CARRYING OUT THE INVENTION

Hereinafter, a description will be given of an example where the present invention is applied to a DC-to-DC converter that is incorporated in a mobile telephone to convert the output voltage of a battery to generate drive voltages for different portions (in particular, a CCD camera) of the mobile telephone.

Figure 1:
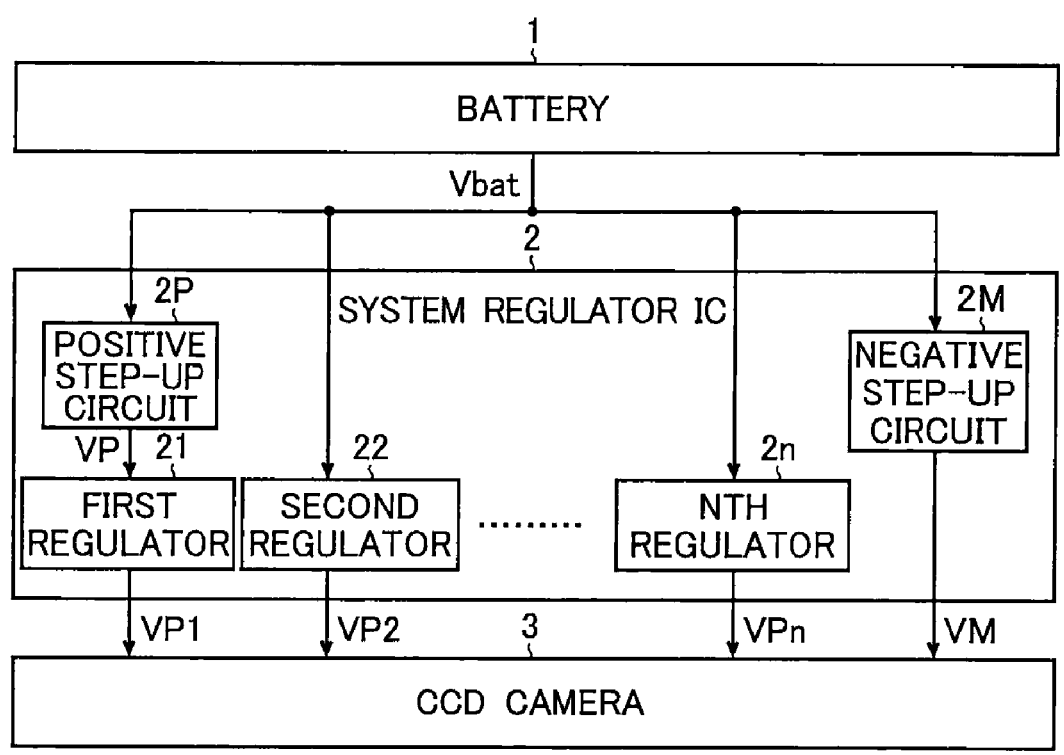
FIG. 1 A block diagram showing a mobile telephone as an embodiment of the present invention.

FIG. 1 is a block diagram showing a mobile telephone (in particular, its power supply system for a CCD camera) as an embodiment of the invention. As shown in FIG. 1, the mobile telephone of this embodiment includes: a battery 1 serving as the power source for the mobile telephone; a system regulator IC 2 serving as means for converting the output of the battery 1; and a CCD camera module 3 serving as means whereby the mobile telephone senses an image. In addition to these components, the mobile telephone of this embodiment naturally includes, as means for realizing its essential capabilities (such as communication capabilities), a transmitter/receiver circuit, a speaker, a microphone, a display, an operating section, a memory and other components, although unillustrated in FIG. 1.

The CCD camera module 3 requires a plurality of drive voltages (e.g., +15.0 V, +3.0 V, +1.8 V and −8.0 V) to drive a CCD element and a DSP (digital signal processor) constituting it and an I/O (input/output) provided for it. Accordingly, the system regulator IC 2 includes a positive step-up circuit 2P for positively stepping up a battery voltage Vbat (e.g., 3.0 V) to a predetermined positive stepped-up voltage VP (e.g., +18 V) and a negative step-up circuit 2M for negatively stepping up the battery voltage Vbat to a predetermined negative stepped-up voltage VM (e.g., −8V); in addition, the system regulator IC 2 includes, as means for producing a plurality of positive voltages VP1 to VPn from the battery voltage Vbat or the positive stepped-up voltage VP, first to nth regulator circuits (series regulator circuits) 21 to 2n. The positive voltages VP1 to VPn and the negative stepped-up voltage VM are all supplied to the CCD camera module 3.

Figure 2:
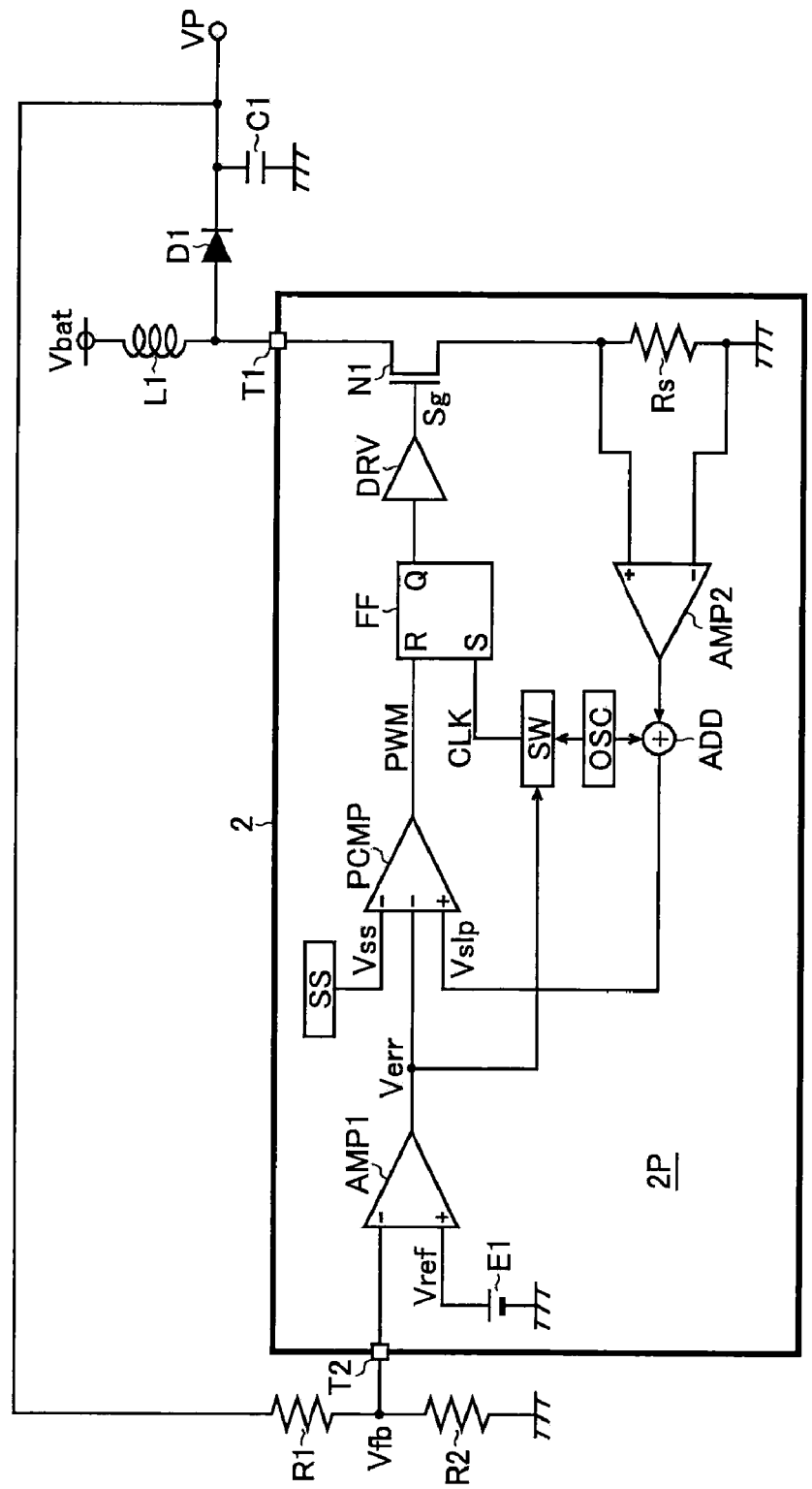
FIG. 2 A circuit diagram showing an example of the configuration of a positive step-up circuit 2P.

FIG. 2 is a circuit diagram (partly a block diagram) showing an example of the configuration of the positive step-up circuit 2P. As shown in FIG. 2, the positive step-up circuit 2P incorporates into an integrated circuit an N-channel field effect transistor N1, a sense resistor Rs, an error amplifier AMP1, an amplifier AMP2, a direct-current voltage source E1, a soft-start circuit SS, an oscillator OSC, an adder ADD, a PWM comparator PCMP, a reset-dominant SR flip-flop FF, a driver circuit (buffer circuit) DRV and a switch circuit SW. Moreover, the positive step-up circuit 2P includes, as elements externally connected to external terminals T1 and T2, an output inductor L1, a reverse-current preventing diode (Schottky barrier diode) D1, an output capacitor C1 and resistors R1 and R2.

The drain of the transistor N1 is connected to the external terminal (switch terminal) T1. The source of the transistor N1 is grounded via the sense resistor Rs (having a resistance of several tens of milliohms).

The inverting input terminal (−) of the error amplifier AMP1 is connected to the external terminal (feedback terminal) T2. The non-inverting input terminal (+) of the error amplifier AMP1 is connected to the positive terminal of the direct-current voltage source E1. The negative terminal of the direct-current voltage source E1 is grounded.

The non-inverting input terminal (+) of the amplifier AMP2 is connected to one end (battery-side end) of the sense resistor Rs. The inverting input terminal (−) of the amplifier AMP2 is connected to the other end (ground-side end) of the sense resistor Rs.

One input terminal of the adder is connected to the output terminal of the amplifier AMP2, and the other input terminal of the adder is connected to the first output terminal (triangular-waveform-voltage output terminal) of the oscillator OSC.

The non-inverting input terminal (+) of the PWM comparator PCMP is connected to the output terminal of the adder ADD. The first inverting input terminal (−) of the PWM comparator PCMP is connected to the output terminal of the error amplifier AMP1. The second inverting input terminal (−) of the PWM comparator PCMP is connected to the output terminal of the soft-start circuit SS.

The set input terminal (S) of the flip-flop FF is connected to the second output terminal (clock output terminal) of the oscillator OSC through the switch circuit SW. The reset input terminal (R) of the flip-flop FF is connected to the output terminal of the PWM comparator PCMP. The output terminal (Q) of the flip-flop FF is connected to the gate of the transistor N1 through the driver circuit DRV.

Outside the system regulator IC 2, the external terminal T1 is connected to the output terminal (where the battery voltage Vbat is present) of the battery 1 via the output inductor L1 (having an inductance of several tens of microhenries), and is also connected to the anode of the reverse-current preventing diode D1. The cathode of the reverse-current preventing diode D1 is, as the output terminal of the positive step-up circuit 2P, connected to the input terminal of the first regulator 21 (unillustrated), and also grounded via the output capacitor C1 (having a capacitance of several microfarads). The output terminal of the positive step-up circuit 2P is also grounded via the resistors R1 and R2. The node between the resistors R1 and R2 is connected to the output terminal T2 of the system regulator IC 2.

Thus, the positive step-up circuit 2P configured as described above is a step-up DC-to-DC converter that obtains a desired positive stepped-up voltage VP at the drain of the transistor N1 serving as a switching element connected between different potentials (the battery voltage Vbat and the ground voltage GND). The positive step-up circuit 2P adopts, as a driving method, peak current mode control by which the driving of the transistor N1 is controlled based on not only the result of the monitoring of the output voltage VP but also the result of the monitoring of the drive current flowing through the transistor N1.

Figure 3:
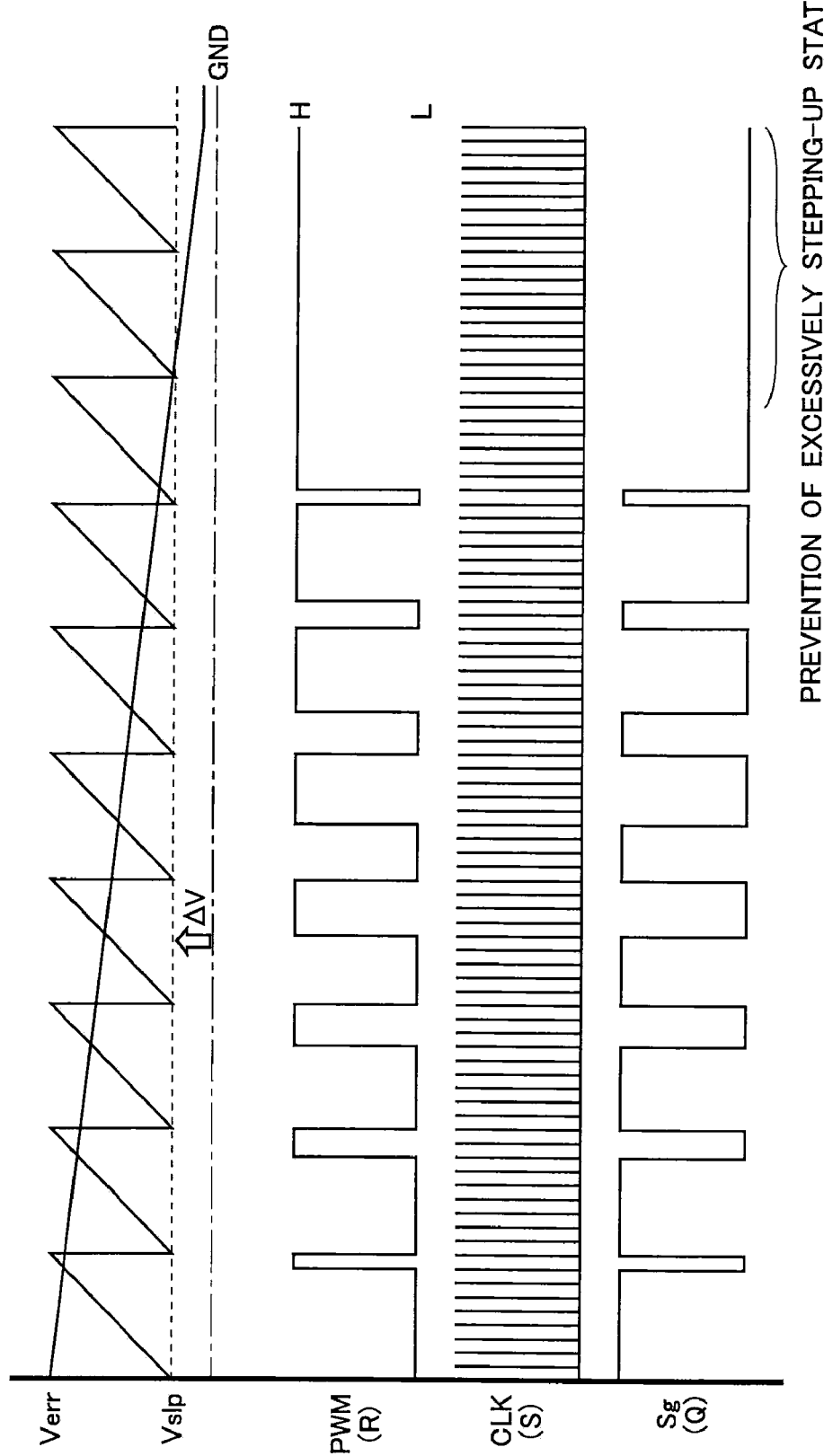
FIG. 3 A diagram illustrating how the positive step-up circuit 2P performs PWM operation.

How the positive step-up circuit 2P configured as described above performs PWM operation (when the positive stepped-up voltage VP is steady) will now be described in detail with reference to FIG. 3.

The error amplifier AMP1 amplifies the voltage difference between a reference voltage Vref (the electromotive voltage of the direct-current voltage source E1) applied to the non-inverting input terminal (+) and a feedback voltage Vfb (a divided voltage of the positive stepped-up voltage VP) applied to the inverting input terminal (−) so as to produce an error voltage Verr. Hence, as the error between the positive stepped-up voltage VP and its target value increases, the error voltage Verr increases.

The PWM comparator PCMP compares whichever of the error voltage Verr applied to the first inverting input terminal (−) and the soft-start voltage Vss applied to the second inverting input terminal is lower with the slope voltage Vslp (the output voltage of the adder ADD which it produces by adding a reference triangular waveform voltage (or a reference slope waveform voltage) from the oscillator OSC to the output voltage of the amplifier AMP2) applied to the non-inverting input terminal (+). Thus, the PWM comparator PCMP generates a PWM signal having a duty ratio corresponding to the comparison result. Hence, so long as the positive stepped-up voltage VP is steady, the logic level of the PWM signal is low when the error voltage Verr is higher than the slope voltage Vslp; the logic level of the PWM signal is high when the error voltage Verr is lower than the slope voltage Vslp.

While the PWM signal (the reset signal to the flip-flop FF) is low, the gate signal Sg to the transistor N1 is held high starting at the rise of a clock signal CLK (having a frequency of several hundred kilohertz to several megahertz) fed to the set terminal (S) of the flip-flop FF, with the result that the transistor N1 is kept on. On the other hand, while the PWM signal is high, the gate signal Sg is held low irrespective of the clock signal CLK, with the result that the transistor N1 is kept off.

As described above, in the positive step-up circuit 2P operating by peak current mode control, the driving of the transistor N1 is controlled based on not only the result of the monitoring of the output voltage VP but also the result of the monitoring of the drive current flowing through the transistor N1. Thus, with the positive step-up circuit 2P of this embodiment, it is possible to directly control driving of the transistor N1 according to the result of the monitoring of the drive current flowing through the transistor N1 even if the generation of the error voltage Verr cannot follow rapid load variations. This helps effectively reduce variations in the positive stepped-up voltage VP. Hence, with the positive step-up circuit 2P of this embodiment, the capacitance of the output capacitor C1 does not need to be increased. Thus, it is possible to avoid unnecessary increases in cost and in the size of the output capacitor C1.

Immediately after the start-up of the positive step-up circuit 2P, the positive stepped-up voltage VP is zero, and thus the error voltage Verr is extremely high. Hence, if a PWM signal is produced according to the comparison result between the error voltage Verr and the slope voltage Vslp, the duty ratio of the PWM signal becomes so high as to cause an inrush current to flow through the output capacitor L1.

To overcome this inconvenience, as described previously, in addition to the error voltage Verr, the positive step-up circuit 2P of this embodiment separately inputs to the PWM comparator PCMP the soft-start voltage Vss that gradually rises after the turning-on of the power; when the soft-start voltage Vss is lower than the error voltage Verr, the positive step-up circuit 2P determines, irrespective of the error voltage Verr, the duty ratio of the PWM signal according to the comparison result between the lower soft-start voltage Vss and the slope voltage Vslp.

The positive step-up circuit 2P of this embodiment includes offsetting means that keeps the slope voltage Vslp shifted from the ground potential to a higher potential by a predetermined offset voltage $\Delta V$ so that the lower limit level of the slope voltage Vslp is higher than that of the error voltage Verr. The offset voltage $\Delta V$ of this embodiment is set at about 100 mV in view of the fact that the lower limit level of the error voltage Verr is raised to higher than the ground potential by several to several tens of millivolts due to the circuit configuration of the error amplifier AMP 1.

With this configuration, the duty ratio of a PWM signal can be reduced, without being affected by the lower limit level of the error voltage Verr, to a desired level (the minimum duty ratio being zero) even at a light load or at no load, that is, even in a situation where the shifting of the slope voltage Vslp to a higher voltage cannot be achieved by peak current mode control. Thus, it is possible to enhance the performance of the error amplifier AMP1 to appropriately control a duty ratio without causing oscillation or the like in the overall system. This helps avoid an excessively stepping-up state.

The overall system performs, as described previously, feedback control to obtain a desired positive step-up voltage VP, and thus is free from any remarkable inconvenience even if the offsetting of the slope voltage Vslp causes the minimum duty ratio to be reduced to zero.

Figure 4:
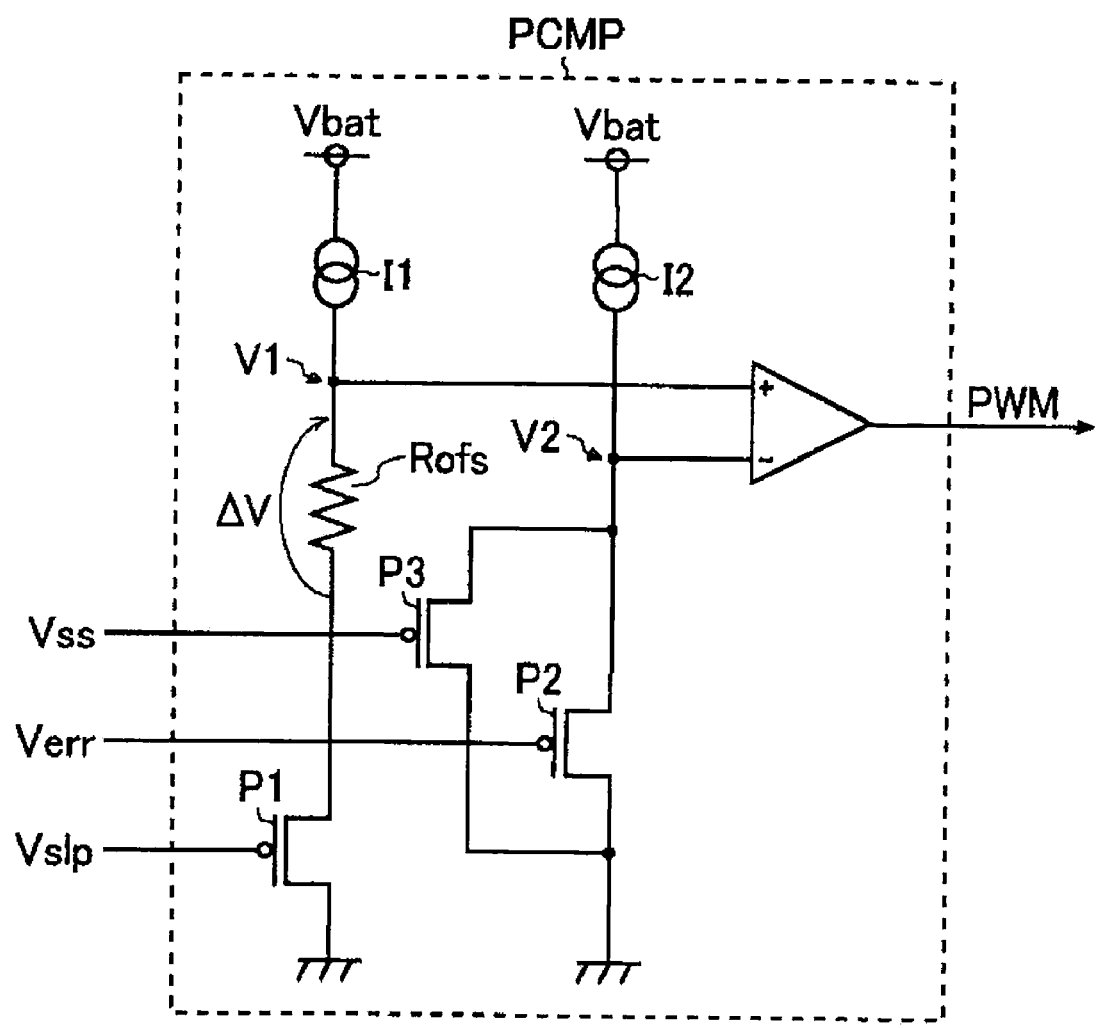
FIG. 4 A circuit diagram showing an example of the configuration of a PWM comparator PCMP.

FIG. 4 is a circuit diagram showing an example of the configuration of the PWM comparator PCMP. As shown in FIG. 4, in its input stage, the PWM comparator PCMP of this embodiment includes: first and second constant current sources I1 and I2, each having one end thereof connected to the power line (Vbat); a first P-channel field effect transistor (first switch element) P1 connected between the other end of the first constant current source I1 and the ground line, the first P-channel field effect transistor being turned on and off according to the slope voltage Vslp; and second and third P-channel field effect transistors (second and third switch elements) P2 and P3 connected between the other end of the second constant current source I2 and the ground line, the second and third P-channel field effect transistors P2 and P3 being turned on and off according to the error voltage Verr and the soft-start voltage Vss, respectively. In addition, the PWM comparator PCMP includes an offset resistor Rofs connected between the other end of the first constant current source I1 and one end (source end) of the first switch element P1, and compares voltages V1 and V2 appearing at the other ends of the first and second constant current sources I1 and I2 to generate a PWM signal.

With this configuration, the input stage of the PWM comparator PCMP incorporates: a level shift capability by which an input voltage is raised to a desired voltage level; and an offsetting capability by which the slope voltage Vslp is kept shifted from the ground potential to a higher potential by a predetermined offset voltage $\Delta V$ so that the lower limit level of the slope voltage Vslp is higher than that of the error voltage Verr. With this configuration, it is possible to realize the offsetting means in a very simple configuration.

Now, a detailed description will be given of how the efficiency of the positive step-up circuit 2P is improved. The efficiency $\eta$ of the positive step-up circuit 2P is represented by a ratio between input and output power in the overall circuit. Thus, if the output current (load current) is high, the consumption current of the positive step-up circuit 2P itself can be ignored in terms of the efficiency $\eta$ of the overall circuit. As the output current becomes low at a light load or at no load, the consumption current of the positive step-up circuit 2P itself, especially the consumption current of the flip-flop FF and the driver circuit DRV greatly affects the efficiency $\eta$ of the overall circuit (see the broken line B in FIG. 6).

The positive step-up circuit 2P of this embodiment includes, as means for improving the efficiency $\eta$ at a light load or at no load, the switch circuit SW controlling whether to input a clock signal CLK to the flip-flop FF according to which of the error voltage Verr and a threshold voltage Vth is higher.

Figure 5:
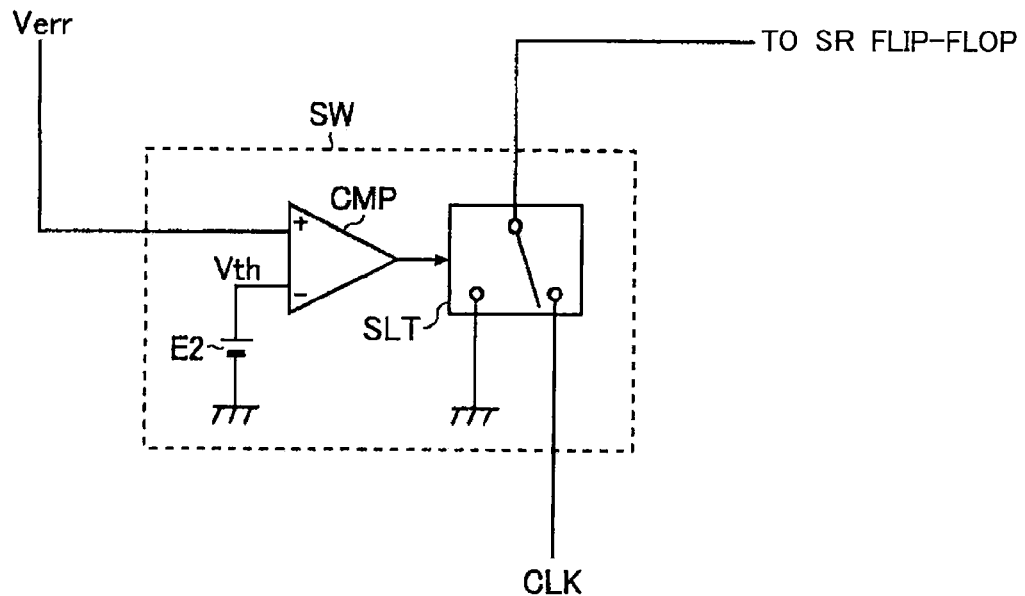
FIG. 5 A diagram showing an example of the configuration of a switch circuit SW.

FIG. 5 is a circuit diagram showing an example of the configuration of the switch circuit SW. As shown in FIG. 5, the switch circuit SW of this embodiment is composed of a comparator CMP, a direct-current voltage source E2 and a selector SLT.

The non-inverting input terminal (+) of the comparator CMP is connected to the output terminal of the error amplifier AMP1 (unillustrated). The inverting input terminal (−) of the comparator CMP is connected to the positive terminal (having the threshold voltage Vth applied thereto) of the direct-current voltage source E2. The negative terminal of the direct-current voltage source E2 is grounded. The output terminal of the comparator CMP is connected to the control terminal of the selector SLT. One input terminal of the selector SLT is connected to the second output terminal (clock output terminal) of the oscillator OSC (unillustrated). The other input terminal of the selector SLT is grounded. The common output terminal of the selector SLT is connected to the set terminal (S) of the flip-flop FF (unillustrated).

The threshold voltage Vth produced by the direct-current voltage source E2 is set equal to the offset voltage $\Delta V$ (100 mV) mentioned previously.

In the switch circuit SW configured as described above, the output logic of the comparator CMP is high when the error voltage Verr is higher than the threshold voltage Vth; the output logic of the comparator CMP is low when the error voltage Verr is lower than the threshold voltage Vth.

When the output logic of the comparator CMP is high, the selector SLT connects the common output terminal to the one input terminal, to which the clock signal CLK is fed, so as to allow the clock signal CLK for the flip-flop FF to be inputted to the selector SLT from the oscillator OSC.

On the other hand, when the output logic of the comparator CMP is low, the selector SLT recognizes that, since the error voltage Verr is lower than the threshold voltage Vth (i.e., the lower limit level of the slope voltage Vslp), the duty ratio of a PWM signal is zero, that is, it recognizes the period of light-load or no-load operation during which the voltage does not need to be raised. Thus, the selector SLT connects the common output terminal to the other output terminal having the ground voltage (low-level) applied thereto so as to interrupt the input of the clock signal CLK to the flip-flop FF.

Figure 6:
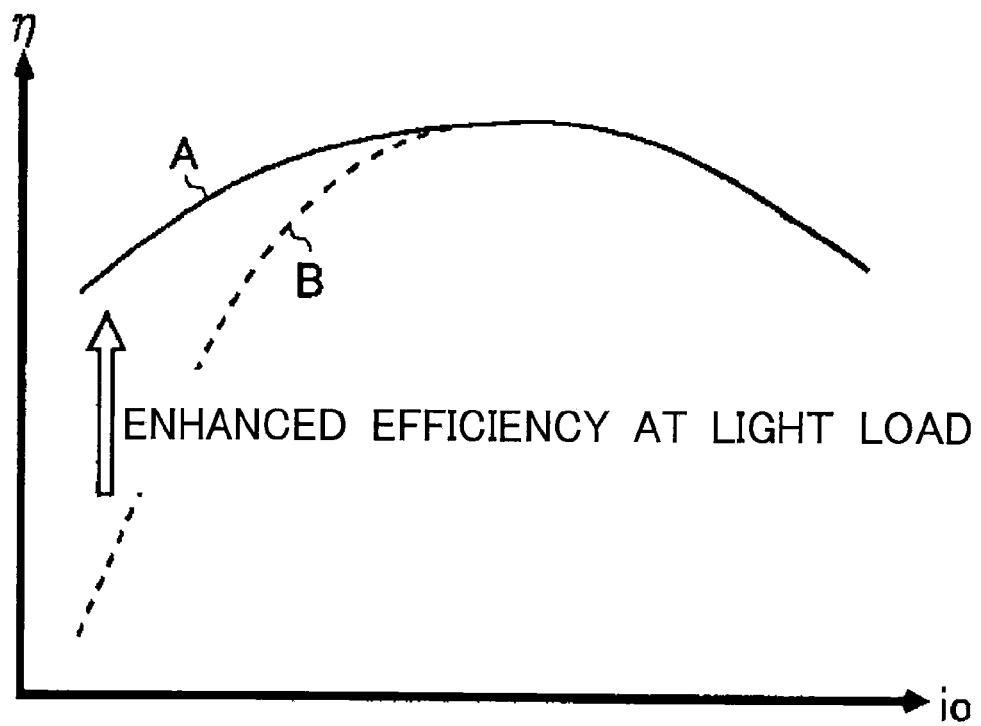
FIG. 6 A diagram illustrating how efficiency is enhanced at a light load.

With this configuration, it is possible to reduce unnecessary current consumption by the flip-flop FF and the driver circuit DRV at a light load or at no load, and thus to improve the efficiency η of the positive step-up circuit 2P (see the solid line A in FIG. 6).

Although the embodiment described above discusses an example where the present invention is applied to the positive step-up circuit 2P operating by peak current mode control, this is not meant to limit the application of the invention in any way; the invention finds wide application in direct-current stabilized power supply apparatuses in general that produce a desired output voltage from an input voltage.

Figure 7:
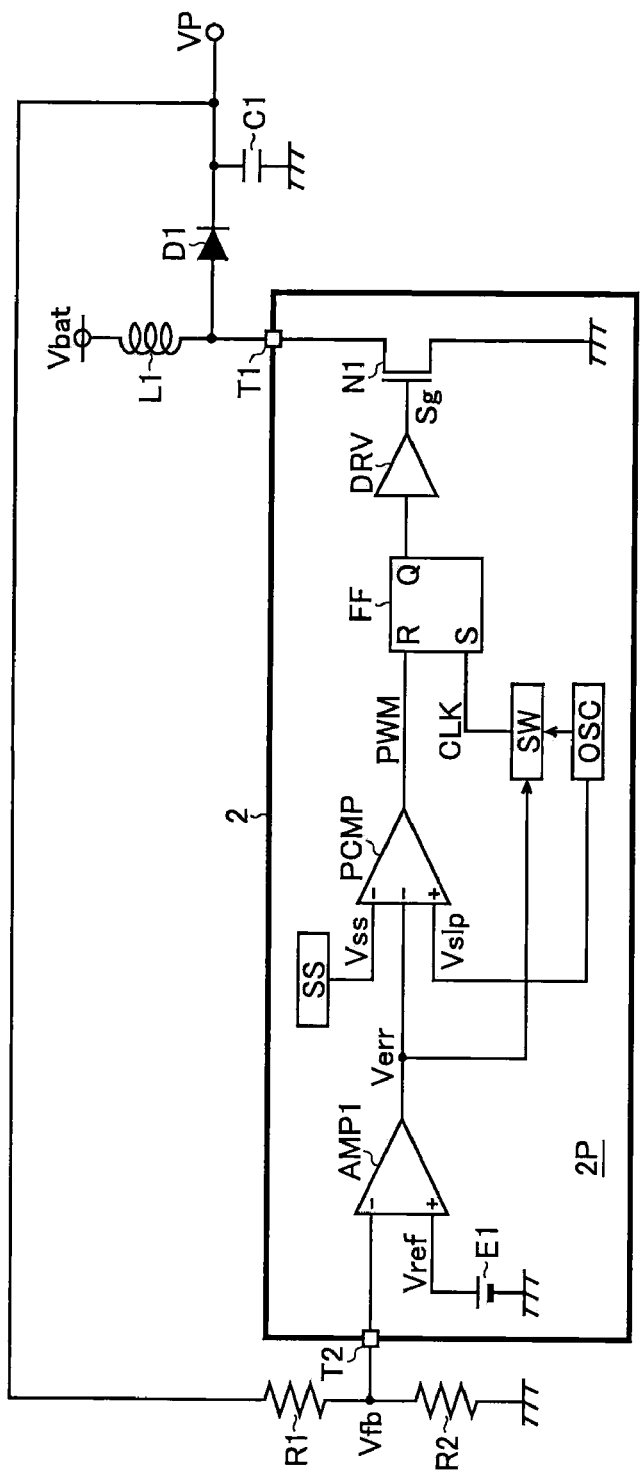
FIG. 7 A circuit diagram showing another example of the configuration of the positive step-up circuit 2P.
Figure 8:
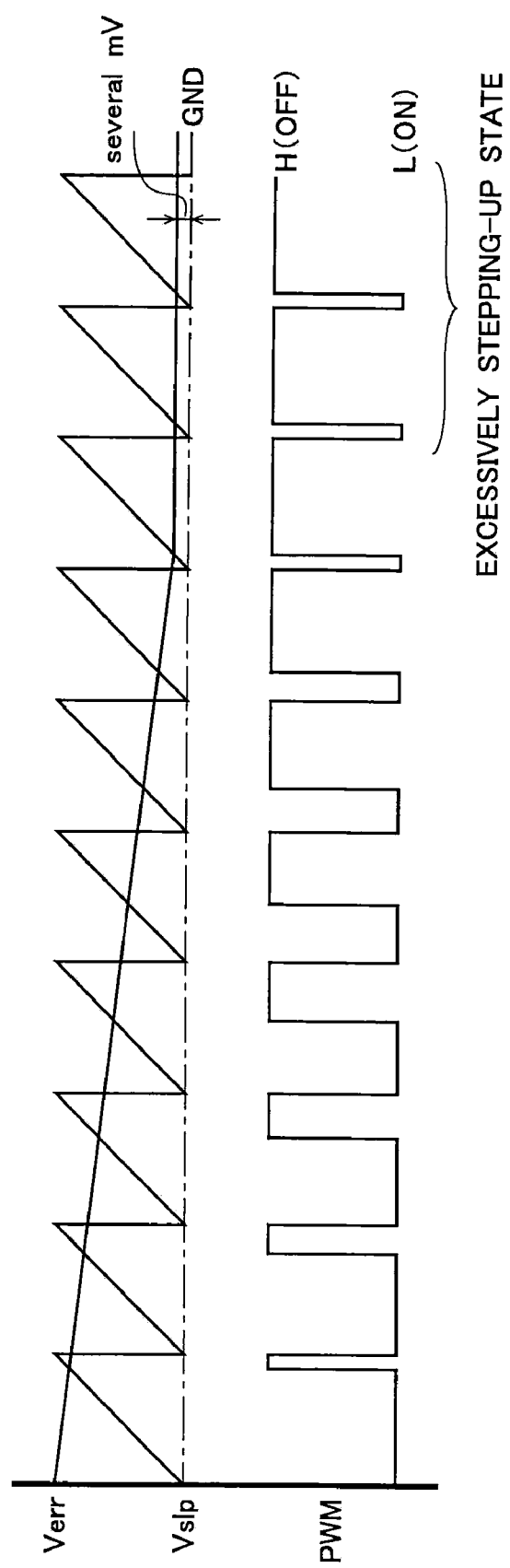
FIG. 8 A diagram illustrating how an excessively stepping-up state occurs.

For example, in a common direct-current stabilized power supply, like the one shown in FIG. 7 that includes the error amplifier AMP1 amplifying the voltage difference between the feedback voltage Vfb varying according to the output voltage VP and the predetermined reference voltage Vref, and that switches the output transistor N1 with the output signal (error voltage Verr) of the error amplifier AMP1, even when the PWM comparator PCMP (i.e., a PWM comparator incorporating an offsetting capability in its input stage) shown in FIG. 4 is provided, the same workings and advantages as described previously can be obtained.

Otherwise than specifically described by way of an embodiment above, many modifications and variations are possible without departing from the spirit of the invention.

For example, although the embodiment described above only discusses an example where a Schottky barrier diode is used as the reverse-current preventing diode D1, an ordinary diode may be used instead. If a synchronous rectification switch circuit is additionally provided, the reverse-current preventing diode D1 may be omitted.

The circuit configuration may be modified such that P-channel and N-channel transistors are used the other way around.

The transistor N1 or the sense resistor Rs may be externally connected; the resistors R1 and R2 may be internally integrated.

Although the embodiment described above discusses an example where the offset resistor Rofs is connected between the other end of the first current source I1 and the source of the first switch element P1, this is not meant to limit the configuration of the invention. The offset resistor Rofs may be connected between the drain of the first switch element P1 and the ground line.

INDUSTRIAL APPLICABILITY

The present invention offers a technology useful in avoiding excessive stepping-up by and improving the efficiency of direct-current stabilized power supply apparatuses generating a desired output voltage from an input voltage.

The invention claimed is:

1. A power supply apparatus comprising:
an output transistor to generate an output voltage from an input voltage by being turned on and off;
an error amplifier to amplify a voltage difference between a feedback voltage commensurate with the output voltage and a predetermined reference voltage to generate an error voltage;
a PWM comparator to compare the error voltage with a predetermined slope voltage to generate a PWM signal having a duty ratio corresponding to a result of comparison; and
on/off control means to turn on and off the output transistor with the PWM signal,
wherein the PWM comparator is operable to keep the slope voltage shifted from a ground potential to a higher voltage by a predetermined offset voltage so that a lower limit level of the slope voltage is higher than a lower limit level of the error voltage;
the PWM comparator comprising, in an input stage thereof:
first and second constant current sources, each having one end thereof connected to a power supply line;
a first switch element connected between the other end of the first constant current source and a ground line, the first switch element operable to be being turned on and off according to the slope voltage; and
a second switch element connected between the other end of the second constant current source and the ground line, the second switch element operable to be turned on and off according to the error voltage,
wherein the PWM comparator further comprises an offset resistor connected between the other end of the first constant current source and one end of the first switch element or between the other end of the first switch element and the ground line, and operable to compare voltages appearing at the other ends of the first and second current sources to generate the PWM signal.

2. The power supply apparatus of claim 1, further comprising:
an inductor having one end thereof connected to an input terminal for the input voltage, and having the other end thereof connected to one end of the output transistor;
a diode having an anode thereof connected to the one end of the output transistor, and having a cathode thereof connected to an output terminal for the output voltage; and
a capacitor having one end thereof connected to the output terminal for the output voltage, and having the other end thereof connected to an input terminal for a reference voltage,
wherein the power supply apparatus is operable to step up the input voltage to generate the output voltage.

3. An electrical device comprising:
a battery serving as a power source for the electrical device; and
a power supply apparatus according to claim 1 serving as means for converting an output of the battery.

4. A power supply apparatus comprising:
an output transistor to generate an output voltage from an input voltage by being turned on and off;
an error amplifier to amplify a voltage difference between a feedback voltage commensurate with the output voltage and a predetermined reference voltage to generate an error voltage;
a PWM comparator to compare the error voltage with a predetermined slope voltage to generate a PWM signal having a duty ratio corresponding to a result of comparison; and
on/off control means to turn on and off the output transistor with the PWM signal, wherein the PWM comparator is operable to keep the slope voltage shifted from a ground potential to a higher voltage by a predetermined offset voltage so that a lower limit level of the slope voltage is higher than a lower limit level of the error voltage, wherein the on/off control means comprises:
an oscillator to generate a predetermined clock signal;
a reset-dominant SR flip-flop to receive at a set terminal thereof the clock signal and to receive receiving at a reset terminal thereof the PWM signal; and
a driver circuit to turn on and off the output transistor with the output signal of the SR flip-flop,
wherein the on/off means further comprises a switch circuit to control whether to input the clock signal to the SR flip-flop according to which of the error voltage and a predetermined threshold voltage is higher.

5. The power supply apparatus of claim 4, wherein the threshold voltage is set equal to the offset voltage.

6. The power supply apparatus of claim 4 further comprising:
an inductor having one end thereof connected to an input terminal for the input voltage, and having the other end thereof connected to one end of the output transistor;
a diode having an anode thereof connected to the one end of the output transistor, and having a cathode thereof connected to an output terminal for the output voltage; and
a capacitor having one end thereof connected to the output terminal for the output voltage, and having the other end thereof connected to an input terminal for a reference voltage,
wherein the power supply apparatus steps up the input voltage to generate the output voltage.

7. An electrical device, comprising:
a battery serving as a power source for the electrical device; and
a power supply apparatus serving as means for converting an output of the battery,
wherein, as said power supply apparatus, the power supply apparatus of claim 4 is used.

8. A power supply apparatus including:
an output transistor generating an output voltage from an input voltage by being turned on and off;
an error amplifier amplifying a voltage difference between a feedback voltage commensurate with the output voltage and a predetermined reference voltage to generate an error voltage;
a PWM comparator comparing the error voltage with a predetermined slope voltage to generate a PWM signal having a duty ratio corresponding to a result of comparison; and
on/off control means turning on and off the output transistor with the PWM signal,
wherein the on/off control means comprises:
an oscillator generating a predetermined clock signal;
a reset-dominant SR flip-flop receiving at a set terminal thereof the clock signal and receiving at a reset terminal thereof the PWM signal; and
a driver circuit turning on and off the output transistor with the output signal of the SR flip-flop, and
the on/off control means further comprises a switch circuit controlling whether to input the clock signal to the SR flip-flop according to which of the error voltage and a predetermined threshold voltage is higher, and the duty ratio of the PWM signal is lowered to zero by the switch circuit.

9. A power supply apparatus including:
an output transistor generating an output voltage from an input voltage by being turned on and off;
an error amplifier amplifying a voltage difference between a feedback voltage commensurate with the output voltage and a predetermined reference voltage to generate an error voltage;
a PWM comparator comparing the error voltage with a predetermined slope voltage to generate a PWM signal having a duty ratio corresponding to a result of comparison; and
on/off control means turning on and off the output transistor with the PWM signal,
wherein the on/off control means comprises:
a switch circuit that lowers the duty ratio of the PWM signal to zero according to which of the error voltage and a predetermined threshold voltage is higher.

10. The power supply apparatus of claim 9 wherein the PWM comparator keeps the slope voltage shifted from a ground potential to a higher voltage by a predetermined offset voltage so that a lower limit level of the slope voltage is higher than a lower limit level of the error voltage.

11. The power supply apparatus of claim 10 wherein the switch circuit is controlled by the error amplifier.

* * * * *